United States Patent [19]
Eda

[11] Patent Number: 5,563,934
[45] Date of Patent: Oct. 8, 1996

[54] PAY PHONE CALL CONTROL APPARATUS FOR ALLOWING CALLS USING PRE-PAID CARDS

[75] Inventor: Shigehiro Eda, Tokyo, Japan

[73] Assignee: Tamura Electric Works, Ltd, Japan

[21] Appl. No.: 391,405

[22] Filed: Feb. 16, 1995

Related U.S. Application Data

[63] Continuation of Ser. No. 78,653, May 25, 1993.

[30] Foreign Application Priority Data

May 29, 1992 [JP] Japan ...................... 4-161869

[51] Int. Cl.⁶ .................. H04M 15/00; H04M 17/00; G06F 17/00; G06K 5/00
[52] U.S. Cl. .................. 379/144; 379/111; 379/112; 379/113; 379/114; 379/115; 379/126; 379/127; 379/143; 235/375; 235/376; 235/380; 235/382
[58] Field of Search .................. 379/91, 111, 112, 379/113, 114, 115, 126, 127, 144, 143, 357; 235/375, 376, 380, 382

[56] References Cited

U.S. PATENT DOCUMENTS

| | | | |
|---|---|---|---|
| 4,326,123 | 4/1982 | Hosterman | 379/144 |
| 4,706,275 | 11/1987 | Kamil | 379/144 |
| 4,757,186 | 7/1988 | Heberle | 235/380 |
| 4,879,744 | 11/1989 | Tasaki et al. | 235/380 |
| 4,907,257 | 3/1990 | Asano et al. | 379/91 |
| 5,068,891 | 11/1991 | Marshall | 379/91 |
| 5,138,650 | 8/1992 | Stahl et al. | 379/114 |
| 5,266,782 | 11/1993 | Alanara et al. | 379/144 |

*Primary Examiner*—Stephen Chin
*Assistant Examiner*—Vijay Shankar
*Attorney, Agent, or Firm*—Blakely, Sokoloff, Taylor & Zafman

[57] ABSTRACT

A call control apparatus for a pay phone includes a reading unit, a calculating unit, and a call enable unit. The reading unit reads out value information of an inserted card. The calculating unit calculates a call time corresponding to a ratio of the value information to a unit call fee when the value information read out by the reading unit does not reach the unit call fee. The call enable unit allows a call service by the call time calculated by the calculating unit.

8 Claims, 3 Drawing Sheets

PAY PHONE CALL CONTROL APPARATUS FOR ALLOWING CALLS USING PRE-PAID CARDS

This is a continuation of application Ser. No. 08/078,653 filed May 25, 1993.

BACKGROUND OF THE INVENTION

The present invention relates to a call control apparatus for a pay phone for performing a call service on the basis of value information of a card such as a prepaid card.

In local call charge systems in various foreign countries, a unit call time and a unit call fee in an initial call period are often different from those in an additional call time. For example, in the United States of America, 25 cents are charged for the initial five minutes as the initial call time from the start of a call and 5 cents are additionally charged every minute in the subsequent additional call time. Of all pay phones connected to a telephone network, a pay phone which accepts a prepaid card for storing message rate information corresponding the prepaid amount offers a call service while charging an amount corresponding to a message rate to the inserted prepaid card.

When a caller enjoys the call service from the prepaid card, and the message rate corresponding to an amount of less than 25 cents is stored as a remaining message rate upon an on-hook operation, he cannot receive another local call service using this prepaid card because the remaining message rate represents an amount less than the unit call fee in the initial call time. This prepaid card is valueless although an unused message rate is stored in the prepaid card, thus causing a large loss to a user.

SUMMARY OF THE INVENTION

It is an object of the present invention to provide a call control apparatus for a pay phone, capable of effectively utilizing a prepaid card or the like.

It is another object of the present invention to provide a call control apparatus for a pay phone, which can eliminate a user's loss caused by a card whose message rate represents an amount less than a unit charge fee in an initial call period.

It is still another object of the present invention to provide a call control apparatus for a pay phone, capable of continuing a call even if a card whose message rate representing an amount less than a unit charge fee in an initial call period is used.

In order to achieve the above objects of the present invention, there is provided a call control apparatus for a pay phone, comprising reading means for reading out value information of an inserted card, calculating means for calculating a call time corresponding to a ratio of the value information to a unit call fee when the value information read out by the reading means does not reach the unit call fee, and call enable means for allowing a call service by the call time calculated by the calculating means.

DESCRIPTION OF THE PREFERRED EMBODIMENT

The present invention will be described in detail with reference to the accompanying drawings.

Figure 1:
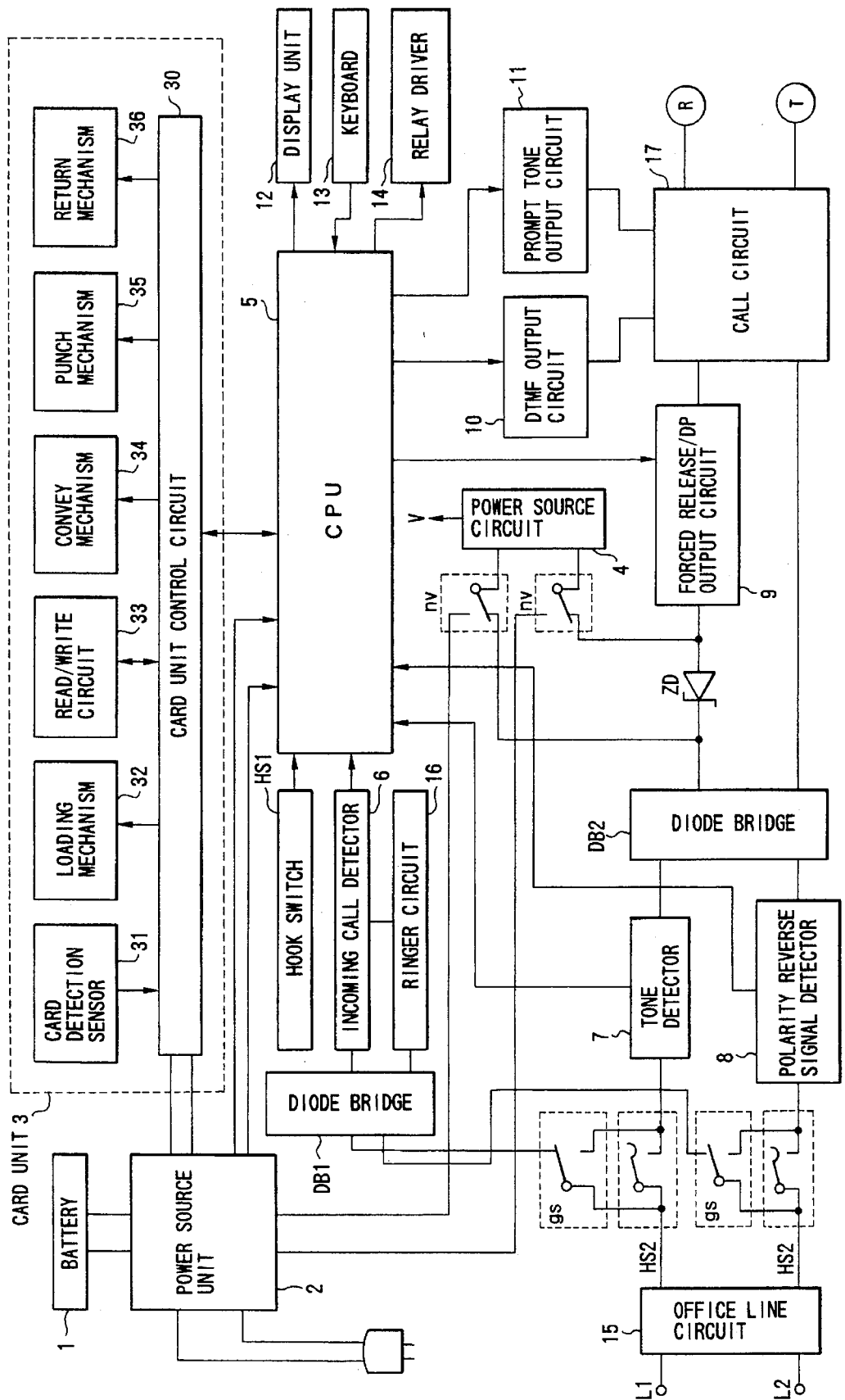
FIG. 1 is a block diagram of a pay phone according to an embodiment of the present invention.

FIG. 1 shows a pay phone according to an embodiment of the present invention. This pay phone allows a call corresponding to a message rate stored in an inserted prepaid card. A battery 1 and a power source unit 2 for converting a commercial AC power source voltage into a predetermined DC voltage apply a voltage to a card unit 3 for performing card processing of the inserted prepaid card and also apply a voltage to a power source circuit 4 through a contact nv. The power source circuit 4 applies a predetermined voltage V to the respective components except for the card unit 3 on the basis of the power source voltage supplied from the power source unit 2. A central processing unit (to be referred to as a CPU hereinafter) 5 receives a power source voltage from the power source circuit 4 to control the overall operation of the pay phone. The CPU 5 is connected to an incoming call detector 6 for detecting an incoming call signal sent through office lines L1 and L2, a tone detector 7 for detecting various tone signals input from the office lines L1 and L2 to confirm that a callee is answered, a polarity inversion signal detector 8 for detecting polarity inversion of the office lines L1 and L2, a forced release/DP output circuit 9 for performing forced release of an office line loop or forming the office line loop and outputting a DP dial signal, a DTMF output circuit 10 for outputting a DTMF signal, a prompt tone output circuit 11 for outputting a prompt tone to a user when a message rate becomes zero, a display unit 12 for displaying a guidance instruction, a remaining message rate, and a remaining call time, a keyboard 13 for inputting a call dial number, a relay driver 14 for receiving a drive power source voltage from the power source unit 2 and driving a call control relay GS (not shown) and a latching type switching relay (NV) (not shown), and a hook switch HS1 interlocked with an off- or on-hook operation.

Reference numeral 15 denotes an office line circuit for interfacing with the office lines L1 and L2; and 16, a ringer circuit for operating a ringer upon reception of an incoming call. The incoming call detector 10 and the ringer circuit 16 are connected to the output of the office line circuit 15 through a contact gs and a diode bridge DB1. Reference numeral 17 denotes a call circuit having a transmitter T and a receiver R to perform speech communication with the office lines L1 and L2. Reference symbol DB2 denotes a diode bridge for giving a predetermined polarity to a Zener diode ZD for defining the voltage of the forced release/DP output circuit 9 and the power source circuit 4 charged with an office line loop current; HS2, a hook switch. The contact gs is almost interlocked with the hook switch for an outgoing or incoming call to form a call loop. The contact nv is a contact of the switching relay NV and is normally connected to the Zener diode ZD and switched to the power source unit 2 by an on-hook operation while the power source unit 2 is set in a power supply state. The contact nv restores the initial state by an on-hook operation.

The card unit 3 comprises a card unit control circuit 30, a card detection sensor 31, a loading mechanism 32, a read/write circuit 33, a convey mechanism 34, a punch mechanism 35, and a return mechanism 36. The card unit control circuit 30 controls the overall operation of the card unit 3. The card detection sensor 31 detects insertion of a card. The loading mechanism 32 loads the inserted card into the card unit 3. The read/write circuit 33 reads out message rate information from the card before a call and writes updated message rate information in the card after the call. The convey mechanism 34 conveys the loaded card. The punch mechanism 35 punches a mark in the card in accordance with the message rate used. The return mechanism 36 returns the loaded card to a user.

A schematic operation of the pay phone having the above arrangement will be described below. When an off-hook operation is performed to make a call, the hook switches HS1 and HS2 are closed to form an office loop. A power source voltage is supplied from the power source circuit 4 charged with the office loop current to the CPU 5 to start the CPU 5. In initialization, the CPU 5 controls the relay driver 14 to turn on the switching relay NV. The power source voltage from the battery 1 or the power source unit 2 is applied to the power source circuit 4. The predetermined voltage V is then supplied from the power source circuit 4 to the respective components in the subsequent operations. At this time, the call control relay GS is driven to release the loop regardless of a loop release operation of the hook switch HS2.

When a prepaid card is then inserted into the card unit 3, the card is detected by the card detection sensor 31 and loaded by the loading mechanism 32 under the control of the card unit control circuit 30. A message rate stored in the card is read out by the read/write circuit 33, and the CPU 5 displays a prepaid call amount corresponding to the read message rate on the display unit 12.

When a user dials a callee's phone number on the keyboard 13, the CPU 5 determines on the basis of the dial number and the message rate read from the card whether a call is allowed. If the call is allowed, the forced release/DP output circuit 9 or the DTMF output circuit 10 is controlled to output a DP or DTMF signal to the office lines.

When the CPU 5 detects answering of the callee on the basis of a detection output from the tone detector 7 or the polarity inversion detector 8, the message rate read from the inserted prepaid card is reduced to connect the line. At the same time, when a periodic polarity inversion signal serving as a charge signal is input, the message rate in the memory is reduced. Alternatively, if no charge signal is sent through the office lines L1 and L2, the message rate in the memory is reduced in response to a time-up output from an internal repetition timer (not shown). When an off-hook operation of the user is detected or the remaining message rate becomes zero, the forced release/DP output circuit 9 is controlled to forcibly release the loop of the office lines L1 and L2. At the same time, the remaining message rate is stored in the memory of the card, and the card is returned to the user.

A telephone network to which the pay phone of this embodiment is connected has a call fee system in which 25 cents are charged for the first five minutes from the start of a local call and 5 cents are charged every minute five minutes after the start of the call. In the pay phone of this embodiment, even if the message rate of the prepaid card inserted at the start of the call is less than the initial call fee for a local call, the call is allowed for a period corresponding to a ratio of the remaining message rate to the initial call fee. That is, even if the remaining message rate is lower than a rate corresponding to 25 cents, the call can be continued within the shortened call time as far as local calls are concerned. If a new card is inserted within the allowed call time, the call can continue.

Figure 2:
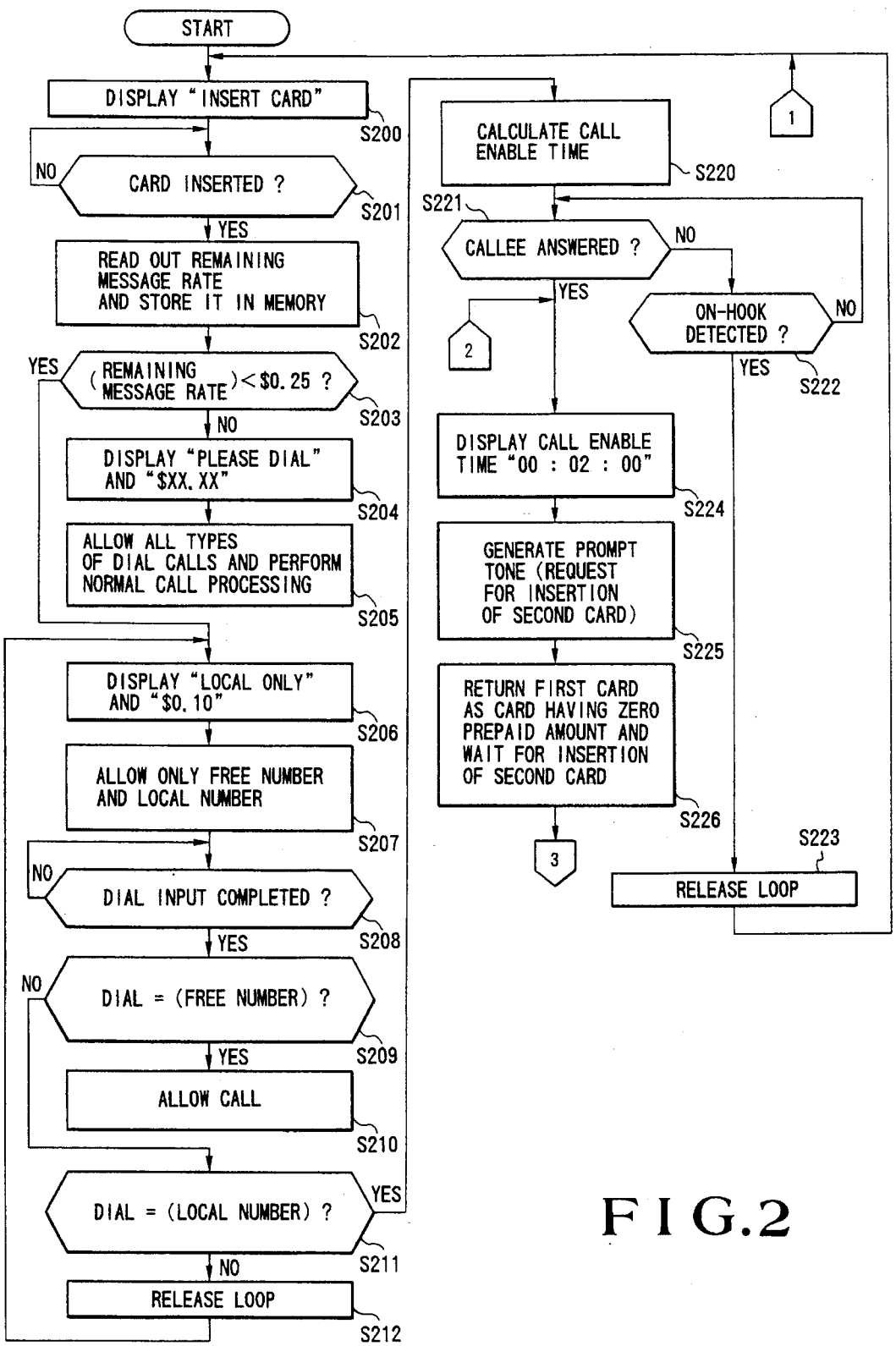
FIG. 2 is a flow chart showing an operation of the pay phone shown in FIG. 1.
Figure 3:
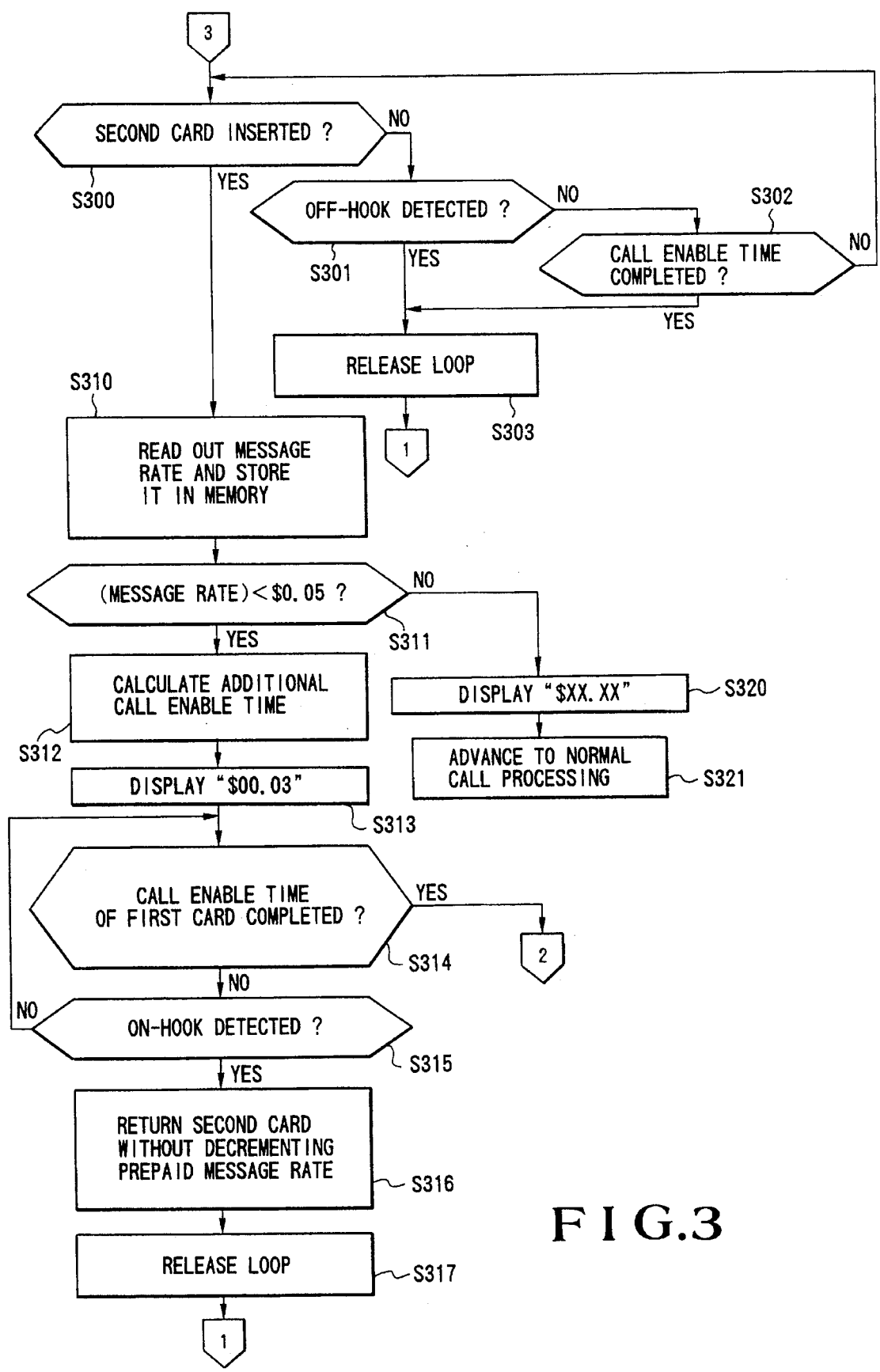
FIG. 3 is a flow chart showing the operation of the pay phone shown in FIG. 1.

FIGS. 2 and 3 are flow charts showing an operation of the CPU 5 in the pay phone of this embodiment. More specifically, these flow charts show a charge operation for an inserted prepaid card.

The CPU 5 receives the power source voltage upon an off-hook operation, as described above. A prompt "INSERT CARD" is displayed on the display unit 12 to prompt a user to insert the prepaid card (step S200). The CPU 5 determines in step S201 whether the card is inserted. If the card is inserted, a remaining message rate read out from the inserted card is stored in an internal memory (not shown) in the CPU 5 through the card unit control circuit 30 (step S202). At the same time, the CPU 5 determines in step S203 whether the amount corresponding to the read remaining message rate is less than 25 cents. If NO in step S203, a prompt "PLEASE DIAL" is displayed on the display unit 12, and at the same time, an amount "$xx.xx" corresponding to the remaining message rate is displayed (sep S204). All dial calls including local calls are allowed, and normal call processing is performed (step S205).

If the amount corresponding to the read remaining message rate of the card does not reach 25 cents, and YES is obtained in step S203, the flow advances to step S206, and a prompt "LOCAL ONLY" is displayed on the display unit 12. At the same time, if the amount of remaining message rate is 10 cents, "$0.10" is displayed to allow dialing of a local number and a free number (e.g., an emergency call, a free call, a call for an operator) (step S207). When a dial number is entered from the keyboard 13 and dialing is completed (step S208), the input dial number is analyzed from step S209. More specifically, if the input dial number corresponds to a free number and YES is obtained in step S209, dialing is allowed to make a free call (step S210). If the input dial number does not correspond to a free number or a local number, so that NO is obtained in step S211, the CPU 5 determines that a long distance call number or an international call number is dialed. The engaged office line loop is released for a predetermined period of time by the forced release/DP output circuit 9 (step S212), and the flow returns to step S206. In step S206, the same display as described above is performed to prompt a redial input.

On the other hand, when the input dial number corresponds to a local number and YES is obtained in step S211, the flow advances to step S220 to calculate a call enable time. That is, the amount corresponding to the remaining message rate is 10 cents and the call fee system requires 25 cents as the initial call fee for 5 minutes, a call enable time M for 10 cents is given as 2 minutes for a local call as follows:

$$M = 5 \text{ (minutes)} \times 0.10 \text{ (\$)} / 0.25 \text{ (\$)} = 2 \text{ (minutes)} \tag{1}$$

The user can continue this call for 2 minutes.

The CPU 5 determines on the basis of the outputs from the tone detector 7 and the polarity inversion signal detector 8 whether the callee answers. If the CPU 5 detects that the callee answers and YES is obtained in step S221, "00:02:00" is displayed on the display unit 12 to inform the user of the call enable time being two minutes (step S224). This call enable time is flickered while being decremented every second. On the other hand, when an on-hook state is detected before answering of the callee is detected in step S221, the on-hook state is detected in step S222 to release the loop (step S223).

After the call enable time is displayed in step S224, a tone for prompting insertion of the second prepaid card is generated by the prompt tone output circuit 11 (step S225). After the remaining message rate of "0" is stored in the card by the read/write circuit 33, the return mechanism 36 is driven to return the card. The CPU 5 waits for insertion of the second prepaid card (step S226).

While the CPU 5 waits for insertion of the second prepaid card, the CPU 5 determines insertion of the second card in stp S300, detects an on-hook state in step S301, and determines the end of the call time in step S302 in a repeated manner. At this time, when the on-hook state is detected and YES is obtained in step S301, or when the call time of the returned card becomes zero and YES is obtained in step S302, the loop is released (step S303), and the flow returns to step S200.

On the other hand, when the second card is inserted and YES is obtained in step S300 while the CPU 5 waits for insertion of the second card, the message rate recorded in the second card and is stored in the internal memory (not shown) in the CPU 5 (step S310). In this embodiment, a call is allowed for each cent. If the amount corresponding to the remaining message rate is one cent, another prepaid card can be inserted within the allowed period of 12 seconds. The CPU 5 determines in step S311 whether the amount corresponding to the read message rate is less than 5 cents. If YES in step S311, an additional call time is calculated (step S312).

If the amount of the remaining message rate of the newly inserted card is 3 cents, an allowed additional call time N is given as follows:

$$N=1 \text{ (minute)} \times 0.03 \text{ (\$)}/0.05 \text{ (\$)}=0.6 \text{ (minutes)} \quad (2)$$

A call time of 0.6 minutes (i.e., 36 seconds) is added.

Equation (2) calculates the additional call time of 3 cents using the charge rate of the additional call time. However, as shown in equation (3), the charge rate of the initial call time may be used to calculate the additional call time:

$$N=5 \text{ (minutes)} \times 0.03 \text{ (\$)}/0.25 \text{ (\$)}=0.6 \text{ (minutes)} \quad (3)$$

In this embodiment, as the ratio of (unit call time)/(unit call fee) in the initial call time is equal to that in the additional call time, the additional call time calculated by equation (2) becomes equal to that by equation (3). However, the relationship between the time and fee in the initial call time is different from that in the additional call time, different call enable times are calculated.

In step S313, "$00.03" as the calculation result is displayed on the display unit to inform the user of the message rate of the newly inserted card being 3 cents.

The CPU 5 determines in step S314 whether the call enable time of the returned card becomes zero. If YES in step S314, the flow returns to step S224 in FIG. 2 to continue the call using the newly inserted card. The call enable time (in this case, 0.6 minutes represented by equation (2)) are displayed on the display unit 12. The same operations as described above are performed upon insertion of third or subsequent used cards.

If the on-hook operation of the user is detected during the call using the already returned card, and YES is determined in step S315, the message rate is not decremented from the newly inserted card, and the card is directly returned to the user (step S316). The loop is released (step S317), and the flow returns to step S200.

If the newly inserted card has a message rate corresponding to the amount of 5 cents or more, and NO is determined in step S311, "$xx.xx" as the message rate of the inserted card is displayed on the display unit 12 (step S320), and normal busy processing is started.

According to the embodiment described above, even when the remaining message rate of the inserted card represents an amount less than the unit call fee, a call service is allowed for a ratio of the remaining message rate to the unit call fee on the basis of the initial call time and/or unit call time.

The above embodiment exemplifies local calls, but the present invention is also applicable to long distance calls and international calls. In this case, a call enable time is calculated in accordance with a ratio of the remaining message rate to the minimum call fee, thereby allowing a call.

The above embodiment exemplifies a prepaid card, but the present invention is also applicable to a credit card. In this case, when the outstanding balance of the credit card is a given amount less than an intitial call fee, the call enable time is calculated on the basis of this given amount.

As has been described above, according to the present invention, even if the remaining message rate of a card represents an amount less than the unit call fee in the initial call time and/or unit call time, a new call is allowed to effectively utilize the used card whose remaining message rate represents an amount less than the unit call fee.

The call enable time corresponding to the remaining message rate of the card is displayed. When the remaining message rate of the inserted card is low, the user can immediately insert the next card, so that the call can continue without the forced release.

What is claimed is:

1. A call control apparatus for a pay phone, comprising:

reading means for reading out a prepaid call value which is stored in an inserted prepaid card, the prepaid call value being obtained by repeatedly subtracting a unit call fee from an initial prepaid call value, the unit call fee being a fee for allowing a communication service for a unit call time;

memory means for storing a remaining prepaid call value obtained by repeatedly subtracting the unit call fee used for the communication service from the prepaid call value from said reading means every unit call time during the communication service;

first calculating means for calculating a first partial call time corresponding to a ratio of the prepaid call value from said reading means to an initial call fee for an initial call time as the unit call fee, when the prepaid call value from said reading means does not reach the initial call fee in the initial call time, the first partial call time being shorter than the initial call time;

second calculating means for calculating a second partial call time corresponding to a ratio of the remaining prepaid call value from said memory means to an additional call fee for an additional call time as the unit call fee, when the remaining prepaid call value from said memory means does not reach the additional call fee in the additional call time, the second partial call time being shorter than the additional call time; and call enable means for allowing the communication service for the partial call time from said first calculating means and the second partial call time from said second calculating means.

2. An apparatus according to claim 1, further comprising display means for displaying the partial call time calculated by said first calculating means.

3. An apparatus according to claim 1, further comprising card returning means for returning the inserted prepaid card when the communication service allowed by said call enable means is started.

4. A pay phone for use with a prepaid card, comprising:

a card unit for performing card processing of an inserted prepaid card, said card unit including reading means for reading out a prepaid call value which is stored in the inserted prepaid card, the prepaid call value being obtained by repeatedly subtracting a unit call fee from an initial prepaid call value, the unit call fee being a fee for allowing a communication service for a unit call time; and a call processing unit for performing call processing on the basis of the prepaid call value from said reading means, said call processing unit including:

memory means for storing a remaining prepaid call value obtained by repeatedly subtracting the unit call fee used for the communication service from the prepaid call value from said reading means every unit call time during the communication service;

first calculating means for calculating a first partial call time corresponding to a ratio of the prepaid call value from said reading means to an initial call fee for an initial call time as the unit call fee, when the prepaid call value from said reading means does not reach the initial call fee in the initial call time, the first partial call time being shorter than the initial call time;

second calculating means for calculating a second partial call time corresponding to a ratio of the remaining prepaid call value from said memory means to an additional call fee for an additional call time as the unit call fee, when the remaining prepaid call value from said memory means does not reach the additional call fee in the additional call time, the second partial call time being shorter than the additional call time; and call enable means for allowing the communication service for the partial call time from said first means and the second partial call time from said second calculation means.

5. The apparatus of claim 1, wherein said call enable means allows the communication service for the partial call time as far as a local call.

6. A call control apparatus for a pay phone, comprising:

reading means for reading out a prepaid call value which is stored in an inserted prepaid card, the prepaid call value being obtained by repeatedly subtracting a unit call fee from an initial prepaid call value, the unit call fee being a fee for allowing a communication service for a unit call time;

memory means for storing a remaining prepaid call value obtained by repeatedly subtracting the unit call fee used for the communication service from the prepaid call value from said reading means every unit call time during the communication service;

first calculating means for calculating a first partial call time corresponding to a ratio of the prepaid call value from said reading means to an initial call fee for an initial call time as the unit call fee, when the prepaid call value from said reading means does not reach the initial call fee in the initial call time, the first partial call time being shorter than the initial call time;

second calculating means for calculating a second partial call time corresponding to a ratio of the remaining prepaid call value from said memory means to an additional call fee for an additional call time as the unit call fee, when the remaining prepaid call value from said memory means does not reach the additional call fee in the additional call time, the second partial call time being shorter than the additional call time; and call enable means for allowing the communication service for the partial call time from said first means and the second partial call time from said second calculation means; and display means for displaying the partial call time calculated by said calculating means.

7. An apparatus according to claim 1, wherein said reading means, first and second calculating means and call enable means are provided in said pay phone.

8. An apparatus according to claim 6, wherein said reading means, first and second calculating means and call enable means are provided in said pay phone.

* * * * *